US012623737B2

(12) United States Patent
Laine et al.

(10) Patent No.: US 12,623,737 B2
(45) Date of Patent: May 12, 2026

(54) CONTROL ARCHITECTURE FOR A SELF-POWERED DOLLY VEHICLE

(71) Applicant: VOLVO TRUCK CORPORATION, Gothenburg (SE)

(72) Inventors: Leo Laine, Härryda (SE); Leon Henderson, Härryda (SE); José Vilca, Gothenburg (SE); Mats Jonasson, Partille (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 848 days.

(21) Appl. No.: 17/760,151

(22) PCT Filed: Feb. 11, 2020

(86) PCT No.: PCT/EP2020/053431
§ 371 (c)(1),
(2) Date: Aug. 4, 2022

(87) PCT Pub. No.: WO2021/160253
PCT Pub. Date: Aug. 19, 2021

(65) Prior Publication Data
US 2023/0082801 A1 Mar. 16, 2023

(51) Int. Cl.
*B62D 53/08* (2006.01)
*B62D 59/04* (2006.01)

(52) U.S. Cl.
CPC ......... *B62D 53/0864* (2013.01); *B62D 59/04* (2013.01)

(58) Field of Classification Search
CPC ..... B62D 53/0864; B62D 59/04; B62D 59/00
See application file for complete search history.

(56) References Cited

U.S. PATENT DOCUMENTS

| | | | | |
|---|---|---|---|---|
| 7,093,682 B2 * | 8/2006 | Cooper | ............... | B62D 59/04 |
| | | | | 180/24.07 |
| 11,279,255 B2 * | 3/2022 | Layfield | .................. | B60L 7/18 |
| 11,420,695 B2 * | 8/2022 | Viele | .................. | B62D 53/005 |

(Continued)

FOREIGN PATENT DOCUMENTS

| | | |
|---|---|---|
| CN | 1965275 A | 5/2007 |
| CN | 110383358 A | 10/2019 |

(Continued)

OTHER PUBLICATIONS

International Search Report and Written Opinion in corresponding International Application No. PCT/EP2020/053431 mailed Nov. 4, 2020 (14 pages).

(Continued)

*Primary Examiner* — Valentin Neacsu
*Assistant Examiner* — Marlon A Arce
(74) *Attorney, Agent, or Firm* — Jeffri A. Kaminski; Venable LLP

(57) ABSTRACT

A dolly vehicle includes at least one motion support device, MSD, and a control unit arranged for vehicle motion management, VMM, wherein the control unit is configurable in a master mode where the at least one MSD is controlled based on a set of capabilities of a vehicle combination comprising the dolly vehicle to fulfil an assigned task. The control unit is configurable in a slave mode where the at least one MSD is controlled based on requests received from an external master control unit.

13 Claims, 4 Drawing Sheets

(56)     References Cited

U.S. PATENT DOCUMENTS

| | | | | |
|---|---|---|---|---|
| 11,443,635 B2 * | 9/2022 | Blomstrand | ............. | B60D 1/46 |
| 12,049,251 B2 * | 7/2024 | Goodarzi | ............. | B62D 53/005 |
| 12,103,615 B2 * | 10/2024 | Schwartz | ............... | B62D 59/04 |
| 2018/0093655 A1 | 4/2018 | Healy et al. | | |
| 2018/0297615 A1 | 10/2018 | Banwart | | |
| 2019/0233034 A1 * | 8/2019 | Viele | ........................ | B60D 1/36 |
| 2020/0198596 A1 * | 6/2020 | Houle | ...................... | B60D 1/06 |

FOREIGN PATENT DOCUMENTS

| | | | |
|---|---|---|---|
| DE | 102017005456 A1 | 12/2017 |
| EP | 3254937 A2 | 12/2017 |
| EP | 3290305 A1 | 3/2018 |
| IL | 261325 A | 1/2019 |
| WO | 2018162030 A1 | 9/2018 |

OTHER PUBLICATIONS

International Preliminary Report on Patentability in corresponding International Application No. PCT/EP2020/053431 mailed May 18, 2022 (6 pages).
European Communication under Rule 71(3) EPC dated Sep. 29, 2023 in corresponding European Patent Application No. 20706638. 2, 8 pages.

* cited by examiner

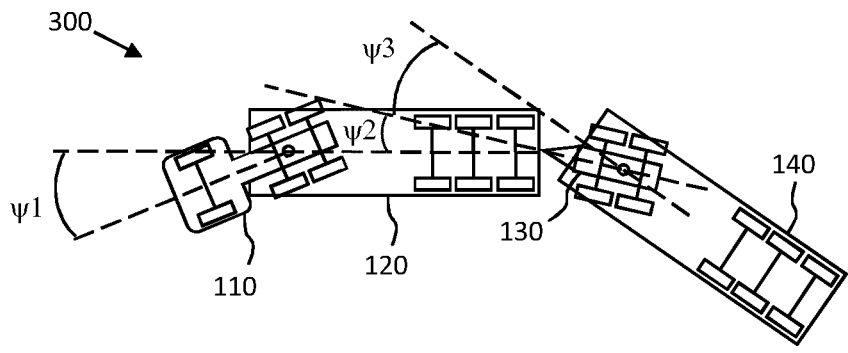
FIG. 4
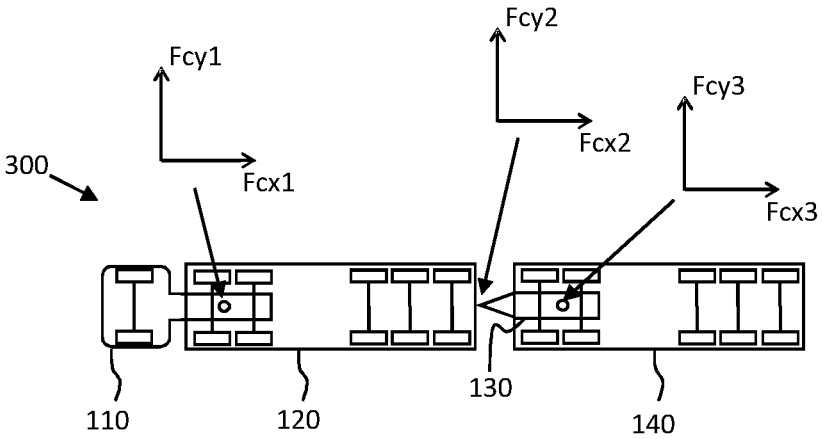
FIG. 5
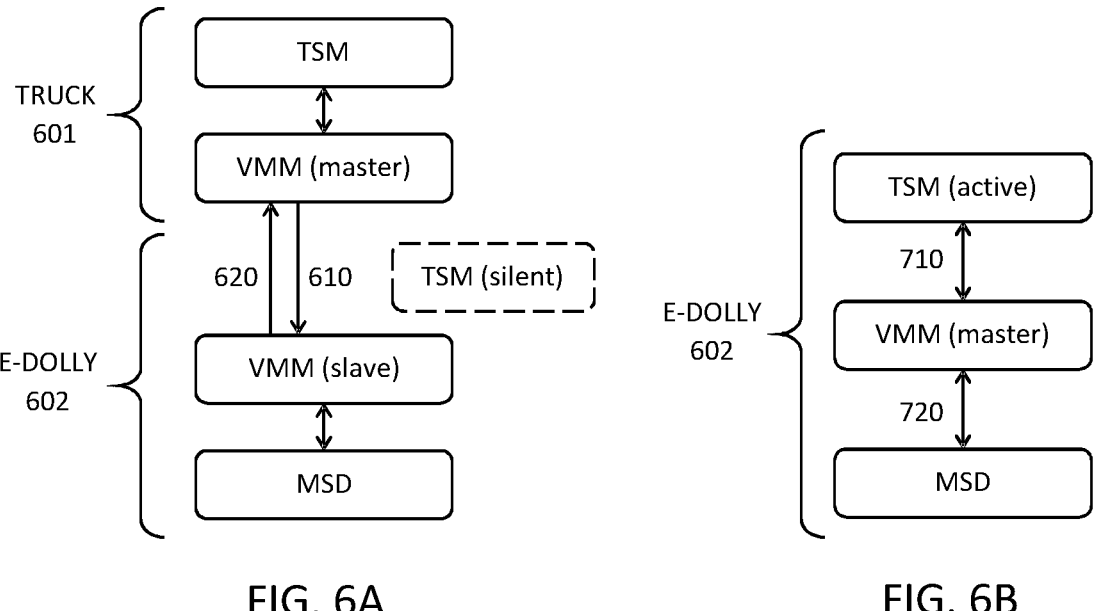
FIG. 6A                                    FIG. 6B

CONTROL ARCHITECTURE FOR A SELF-POWERED DOLLY VEHICLE

CROSS-REFERENCE TO RELATED APPLICATIONS

This application is a U.S. National Stage application of PCT/EP2020/053431, filed Feb. 11, 2020 and published on Aug. 19, 2021, as WO 2021/160253, all of which is hereby incorporated by reference in its entirety.

TECHNICAL FIELD

The present disclosure relates to heavy-duty vehicles, such as trucks and construction equipment, and in particular to dolly vehicles comprising at least one motion support device (MSD) and a control unit for controlling the motion support device. Although the invention will be described mainly with respect to semi-trailer vehicles and trucks, the invention is not restricted to this particular type of vehicle but may also be used in other types of vehicles.

BACKGROUND

A semitrailer vehicle normally comprises a tractor arranged to tow a trailer unit via a fifth wheel connection. In order to extend the cargo transport ability of the semitrailer vehicle, a dolly vehicle can be added to the vehicle combination which allows for additional trailer units to be towed by the same tractor. A traditional dolly is an unpowered vehicle unit designed for connection to a tractor unit, truck or prime mover vehicle with strong traction power.

Dolly vehicles comprising on-board power sources such as electric machines and dolly vehicles with one or more steered axles have recently been proposed. Such dolly vehicles can provide additional power to the vehicle combination, thus reducing the traction power requirements imposed on the prime mover vehicle. Electrified dolly vehicles may also reduce overall fuel consumption by the vehicle combination, since they provide a degree of hybridization to conventional diesel-engine powered tractors. Steered axle dolly vehicles may furthermore be used for improved steering of the vehicle combination, e.g., when negotiating sharp curves.

WO 2018/1152030 discloses one interesting example use of such electrified dolly vehicles.

This type of advanced dolly vehicle relies on one or more on-board control units implementing control methods for performing various tasks.

US 2018/297815 A1 also discloses use of electrified dolly vehicles.

There is a need for more advanced such control units and systems in order to extract the full potential of self-powered and/or steerable dolly vehicles.

SUMMARY

It is an object of the present disclosure to provide control units and methods for controlling self-powered and/or steerable dolly vehicles as well as vehicle combinations comprising one or more dolly vehicles. This object is obtained by a dolly vehicle comprising at least one motion support device (MSD) and a control unit arranged for vehicle motion management (VMM). The control unit is configurable in a master mode where the at least one MSD is controlled based on a set of capabilities of a vehicle combination comprising the dolly vehicle to fulfil an assigned task. The control unit is also configurable in a slave mode where the at least one MSD is controlled based on requests received from an external master control unit.

Thus, the dolly vehicle may interact with an eternal control unit in slave mode but may also assume control over itself and potentially also other connected vehicles by configuring itself in master mode. This is an advantage since the dolly functions can be used also when the dolly is connected to a towing truck lacking a control unit which is configurable in master mode (the dolly can then become the master). The dolly unit can also operate as a towing vehicle, for instance when it is not connected to a towing truck via its drawbar. In this case it can manage vehicle control by configuring itself in master mode.

According to aspects, the master mode is automatically configured when a drawbar of the dolly vehicle is in a disconnected state. This means that, for instance, safety features implemented in the VMM may remain functional even if connection to a master VMM in a towing truck is lost as the master VMM is disconnected from the dolly.

According to aspects, the dolly vehicle is arranged to, when in the master mode configuration, determine a curvature and/or an acceleration request comprising longitudinal and/or lateral acceleration, determine required global vehicle forces in response to the requests, and control the at least one MSD to coordinate and generate the required global vehicle forces and moments, wherein the moments comprises any of a yaw moment, a roll moment, and a pitch moment. Thus, the dolly vehicle may assume the role of towing truck for a vehicle combination. The dolly vehicle may, e.g., move trailers up to a loading dock or park trailers in a cargo terminal by configuring itself in master mode and then executing a requested mission.

According to aspects, the slave mode is automatically configured when the drawbar of the dolly vehicle is at least indirectly connected to a master vehicle. A master vehicle is here a vehicle comprising a control unit arranged to operate in the master mode. This feature ensures that there are never two master control units in a vehicle combination, since these two master control units may come into conflict with each other and negatively affect vehicle stability.

According to aspects, the slave mode is automatically configured when the control unit of the dolly vehicle is connected via wireless link to an external control unit. This means, e.g., that a control tower or other remote wirelessly connected unit connects to the dolly unit. This way convenient control of the dolly MSDs is enabled.

According to aspects, the dolly vehicle is arranged to, when in the slave mode configuration, receive a request for generating one or more required dolly vehicle forces and/or moments and to control the at least one MSD to generate the one or more required dolly vehicle forces. This way an efficient interface to the dolly MSDs are provided, since the MSDs need not be individually controlled. Instead the dolly vehicle manages its own MSDs at least partly based on sensor systems comprised in the dolly, such as wheel speed sensors and coupling force sensors.

According to aspects, the dolly vehicle is arranged to, when in the slave mode configuration, receive state information from the external master vehicle control unit and/or from an external control unit connected via wireless link, wherein the state information is associated with a local coordinate system of the dolly vehicle. By receiving state information and requests from the master control unit in the local coordinate system the dolly does not need to keep track of other vehicle units in the combination. Instead it can focus on its own operation and try to fulfil requests in its own coordinate system based on sensors and MSDs in that same coordinate system. The state information may comprise any of a velocity vector, an acceleration vector, and a rotation associated with the dolly vehicle.

According to aspects, the dolly vehicle is arranged to control the at least one MSD to generate a requested coupling force associated with the drawbar or with a fifth wheel connection of the dolly vehicle. By allowing control of coupling forces, the master VMM operating in, e.g. the towing truck, is given more freedom when it comes to vehicle combination control. The coupling forces are normally desired to be small, but during some maneuvers non-zero coupling forces may be desired to control the vehicle combination in order to obtain a desired motion behavior.

There is also disclosed herein methods, computer interfaces, computer programs, computer readable media, computer program products and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings:

FIGS. 1A-B schematically illustrate some example heavy duty vehicle combinations;

FIG. 1C schematically shows a dolly vehicle autonomously operating a trailer;

FIG. 2 schematically illustrates vehicle motion management control functions;

FIGS. 3-5 show vehicle combinations comprising a dolly vehicle;

FIGS. 6A-B show example vehicle control stacks;

DETAILED DESCRIPTION OF EXAMPLE EMBODIMENTS OF THE INVENTION

Figures 1A, 1B, 1C, 2, 3:
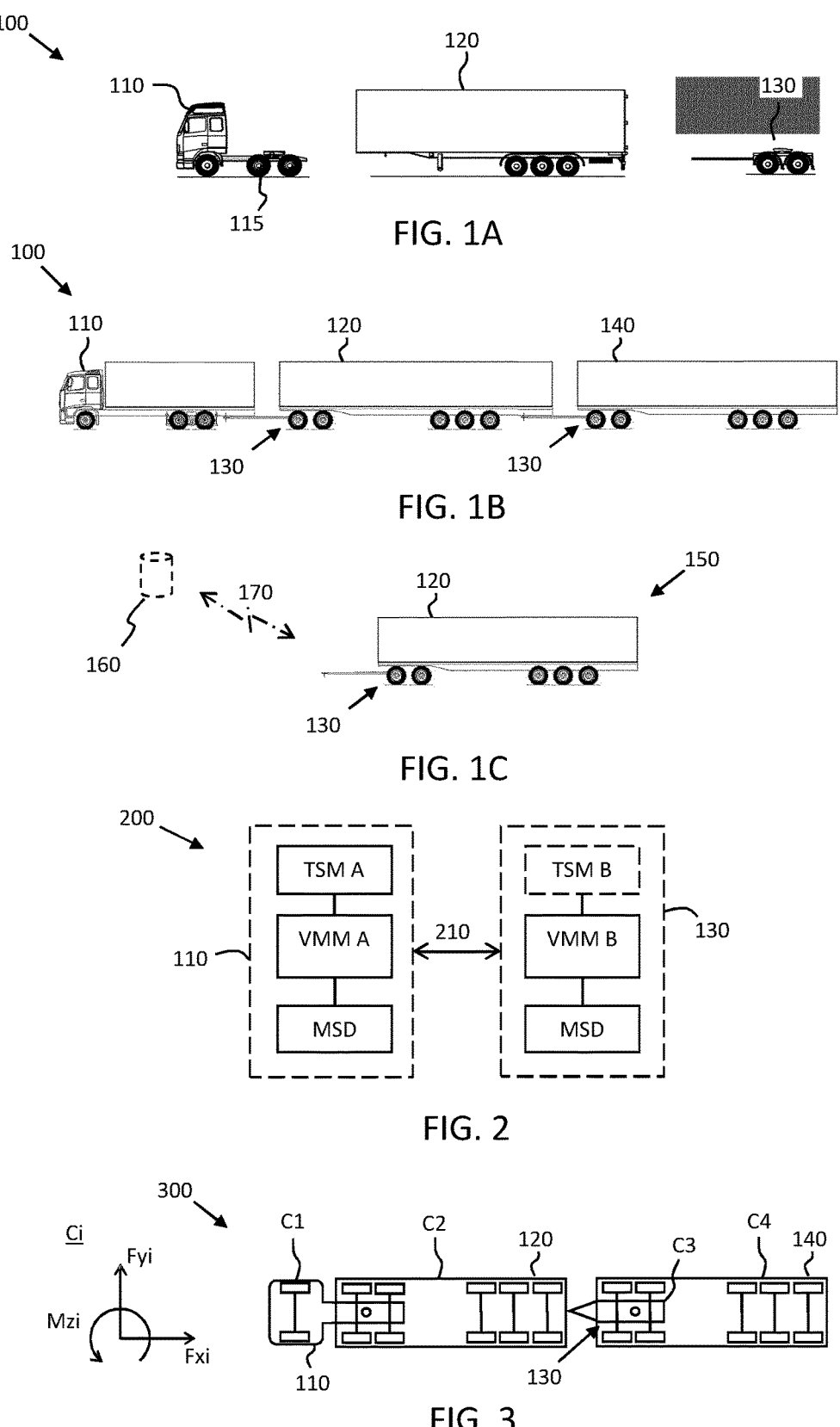

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIGS. 1A-C illustrate example vehicles 100 for cargo transport where the herein disclosed techniques can be applied with advantage. FIG. 1A shows a truck or towing vehicle 110 supported on wheels 115, at least some of which are driven wheels. The truck 110 is configured to tow a first trailer unit 120 by a fifth wheel connection in a known manner. To extend the cargo transport capability of the vehicle combination, a dolly vehicle 130 can be connected to the rear of the first trailer 120. This dolly vehicle can then tow a second trailer 140, as illustrated in FIG. 1B, where the towing vehicle 110 also carries some cargo. More than one dolly unit can be added to a vehicle combination in order to tow more than one extra trailer unit, as shown in FIG. 1B. The concepts disclosed herein can be extended to multiple trailers towed by one tractor. To distribute propulsion in the vehicle combination or road train some of the units can be equipped with propulsion devices. One good candidate for carrying an extra propulsion device is the dolly because it is easy to de-couple from the trailers and does not need to be at a standstill when loading and unloading cargo into the trailer unit.

A dolly vehicle 130 is traditionally a passive un-powered vehicle comprising no driven axles nor any steerable axles. It has, however, recently been shown that self-powered dolly vehicles may provide both increased fuel efficiency and maneuverability. Increased fuel efficiency is for instance obtained if an electric machine arranged for regenerative braking is installed in the dolly vehicle. The vehicle combination then effectively becomes a hybrid electric vehicle, even if the towing vehicle only comprises a traditional diesel engine with no electric hybridization.

The increased maneuverability obtained from a dolly vehicle comprising one or more steerable axles can, for instance, be used for improving turning ability of the combination vehicle, since the dolly vehicle can be used to steer the second trailer unit 140 as the vehicle combination turns in order to reduce the total area swept by the vehicle combination. This allows longer vehicle combinations to negotiate sharper curves, thus extending the operational domain of such longer vehicles to, e.g., urban environments.

FIG. 1C shows a vehicle 150 comprising only a dolly vehicle 130 and a first trailer unit 120. In this configuration the self-powered dolly vehicle is the towing vehicle and operates in an autonomous or semi-autonomous manner. The dolly vehicle can then autonomously or via remote control maneuver the first trailer unit 120, for instance to park the trailer or bring it up to a loading bay. The remote control may be performed by an external server or control function 160 connected to the dolly vehicle control unit via wireless link 170.

The towing vehicle 110 and the self-powered and/or steerable dolly vehicle 130 both require control units. These control units may be arranged according to a layered functional architecture where some functions may be comprised in a traffic situation management (TSM) layer and some other functions may be comprised in a vehicle motion management (VMM) layer. Herein, the VMM layer is at times referred to as a control unit and at times referred to as a function. As far as this disclosure is concerned the two are exchangeable, since the VMM control unit is configured to execute the VMM function and the VMM function resides in a control unit of some sort.

FIG. 2 illustrates such control layers. A TSM layer plans vehicle operation with a time horizon of, e.g., 10 seconds. This time frame for instance corresponds to the time it takes for the vehicle to negotiate a curve, i.e., to transition from driving straight to entering the curve and then exiting the curve again. The vehicle maneuvers planned and executed by the TSM are associated with acceleration profiles and curvature profiles. The TSM layer continuously requests the desired acceleration profiles ($a_{req}$) and curvature profiles ($c_{req}$) from the VMM layer. For instance, if the vehicle unit has a steered front axle and a driven rear axle, then the curvature request may comprise a virtual steer angle which is represented by a vehicle model with predicted properties within the TSM layer. Either the interface between TSM and VMM is only controlling the initial system inputs and the rest is inherited or predicted from a vehicle model system or the TSM actually controls also directly dolly motions such as steering, braking, and so on.

The VMM layer operates with a time horizon of about 1 second or so, and continuously transforms the acceleration profiles and curvature profiles into control commands for the various motion support device (MSD) functions on the vehicle, i.e., it among other things performs MSD coordination. One such MSD function are the service brakes of the towing vehicle and the trailer units. Another MSD function may be one or more electric machines arranged to power the vehicle combination.

The VMM also controls vehicle modes, i.e., if the vehicle is turned off, parked, or in motion. If the vehicle is in motion, the VMM performs motion estimation, i.e., determines positions, speeds, accelerations, articulation angles of the different units in the combination vehicle. The VMM furthermore manages force generation and coordination, i.e., it determines what forces and moments that are required in order to fulfil the requests from the TSM layer, for instance to accelerate the vehicle according to a requested acceleration profile received from the TSM or to generate a certain curvature along which the vehicle combination moves. The forces may comprise, e.g., longitudinal forces and lateral forces, and the moments may relate to, e.g., moments about vehicle unit mass centers and/or moments about the articulation points of the vehicle combination. The VMM also, based on the determined forces and moments, performs coordination of the various MSDs in the vehicle combination in order to obtain the desired vehicle actions. This may entail, e.g., coordinating propulsion devices, service brakes, auxiliary brakes, suspension and steering. The translation between TSM requests (such as acceleration profiles and curvatures) and MSD actions by a VMM layer are known in general and will therefore not be discussed in more detail herein.

The present disclosure mainly relates to the VMM modules in the control units of a vehicle combination comprising one or more self-powered and/or steerable dolly vehicles 130, and in particular to how the functionality is distributed between the control unit in the master or towing vehicle and a dolly vehicle in different scenarios.

FIG. 2 schematically shows a control stack 200 in which various vehicle control functions are incorporated. The truck 110 comprises one stack, and the dolly vehicle 130 comprises another stack. The two stacks are connected via an interface 210 which will be discussed in more detail below. As long as the truck is connected to the dolly, the truck acts as master, while the one or more dolly vehicles operate in a slave mode. Thus, although the control unit in the dolly vehicle 130 comprises a stand-alone TSM function (TSM B), for use, e.g., in scenarios like that shown in FIG. 1C, this function is at least partly inactivated in FIG. 2 since the TSM functions are being executed by the master control unit in the truck 110. When the dolly vehicle 130 decouples from the master control unit, however, the VMM slave mode in the dolly is shifted to VMM master mode and now calculates its own forces and moments based on requests received from the on-board TSM function (TSM B). The one or more trailer units may also comprise VMM modules comprised in control units. If the dolly 130 has a semitrailer connected, as in FIG. 1C, then the VMM function on the trailer unit receives global force requests and moment requests from the VMM in the dolly instead of from the VMM in the truck 110. The VMM function in the trailer normally operates in slave mode.

A dolly vehicle VMM function operating in slave mode receives force generation data from a master control unit and therefore disables its own force generation function in order not to interfere with the master control. The force generation data is preferably translated into a local coordinate system of the dolly vehicle, as will be discussed in more detail below in connection to FIGS. 3 and 4. The master VMM performs actuator coordination and sends requests to the MSDs in the dolly and in any trailers towed by the dolly vehicle. The dolly VMM acting in slave mode then forwards the MSD requests from the master VMM to its MSDs, such as steering, powertrain, and brakes. Active suspension may also be comprised in the set of MSDs. The VMM acting in slave mode performs motion estimation for the dolly vehicle 130 and reports back the result of this estimation to the master VMM which normally resides in the prime mover 110. The dolly VMM operating in slave mode also controls on-board functions such as powertrain configuration, parking brakes, and trailer coupling. The VMM function in slave mode may furthermore perform slip control.

Thus, when the dolly vehicle is operating in slave mode, the dolly is coordinated by the main unit in the tractor 110 or by some other main unit 160 via wireless link. The main unit sends requests to all actuators comprised in the vehicle combination, including those on the dolly vehicle based on the information of the whole vehicle combination. This overall coordination of propulsion, steering and braking can improve the manoeuvrability and stability of the articulated vehicle.

This way, when the dolly vehicle is operating in the slave mode, a centralized master VMM may, e.g., send requests of global forces and moments to the slave mode VMM in the dolly. The requests are preferably formulated in a local coordinate system of the dolly. A master mode VMM decides how coupling forces shall be controlled and also how the desired overall motion of the vehicle combination is to be obtained. A slave mode VMM sends current status comprising, e.g., currently generated forces and moments and also its current capabilities for generating forces and moments. A slave mode VMM may also send the vehicle unit's states formulated in its local vehicle coordinate system to the master mode VMM. The communication between master and slave mode control units is either via wireless connection such as a unit to unit (U2U) communication or via some form of wired communication such as Ethernet communication between units.

To summarize, according to aspects, the dolly vehicle 130 is arranged to, when in the slave mode configuration, receive a request for generating one or more required dolly vehicle forces and to control the at least one MSD to generate the one or more required dolly vehicle forces.

According to aspects, the dolly vehicle 130 is arranged to, when in the slave mode configuration, receive state information from the external master vehicle control unit and/or from an external control unit connected via wireless link, wherein the state information is associated with a local coordinate system of the dolly vehicle.

According to aspects, the state information comprises any of a velocity vector, an acceleration vector, and a rotation associated with the dolly vehicle.

According to aspects, the state information corresponds to state information associated with the master vehicle and geometrically transformed into a local coordinate system associated with the dolly vehicle.

According to aspects, the dolly vehicle 130 is arranged to, when in the slave mode configuration, transmit status information and capability information to the external master vehicle control unit and/or to an external control unit connected via wireless link.

A dolly vehicle VMM function operating in master mode instead receives acceleration and curvature requests from a dedicated TSM function, such as TSM B in FIG. 2. This dedicated TSM function is normally an on-board function, but it could also be a function which is executed external to the dolly vehicle, i.e., wirelessly connected 170 to the dolly vehicle 130 from a control tower or the like comprising a server function 160.

The dolly vehicle VMM function operating in master mode performs force and moment generation. This means that the VMM function translates the acceleration and curvature requests from the TSM function into the required forces and moments which are required for the vehicle combination to behave according to the acceleration and curvature request. The forces and moments are sometimes referred to as a global forces and moments. The global forces and moments are used as input for actuator coordination, which actuator coordination results in requests sent to the MSDs. For instance, the actuator coordination may result in a request for positive or negative torque sent to an electric machine, and/or a request for negative torque sent to a service brake. In other words, according to aspects, the dolly vehicle 130 is arranged to, when in the master mode configuration, determine a curvature and/or an acceleration request comprising longitudinal and/or lateral acceleration, determine required global vehicle forces in response to the requests, and control the at least one MSD to coordinate and generate the required global vehicle forces and moments, wherein the moments comprises any of a yaw moment, a roll moment, and a pitch moment. The moments may be with respect to a mass center of a vehicle unit or with respect to some articulation point of a vehicle combination.

The VMM acting in master mode also performs motion estimation for the dolly vehicle 130 and reports back the result of this estimation to the TSM function. The dolly VMM operating in master mode also controls on-board functions such as powertrain configuration, parking brakes, suspension and trailer coupling. The VMM function in master mode may furthermore perform slip control.

Thus, in master mode, the dolly vehicle can control its various actuators based on the current capabilities of the whole system and the assigned task. e.g., following a pre-defined path. The design follows a principle of centralizing the information and decisions to the VMM layer. This allows the dolly vehicle operating as master to performs several driving manoeuvres, e.g., forwarding, reversing, parking, etc. Moreover, the dolly vehicle operating in master mode can be arranged for auto coupling and decoupling of the fifth wheel of the dolly to a semi-trailer.

To summarize there is disclosed herein a dolly vehicle 130 comprising at least one MSD and a control unit arranged for vehicle motion management, i.e., comprises a VMM module. The control unit is configurable in a master mode where the at least one MSD is controlled based on a set of capabilities of a vehicle combination 150 comprising the dolly vehicle 130 to fulfil an assigned task. The control unit is also configurable in a slave mode where the at least one MSD is controlled based on requests received from an external master control unit.

According to some aspects, the dolly vehicle control unit implements an authorization function. This authorization function prevents use of dolly functions until proper authorization has been provided. The authorization function may, e.g., work according to a challenge-response method, where the dolly control function requests authorization from an external master control function prior to entering slave mode and accepting requests from the master control function. The authorization function may also prevent the dolly control unit from entering into master mode and performing some task requested from an external function before that external function has provided the proper authorization. This proper authorization may comprise, e.g., an encrypted key or other form of shared secret.

Thus, there is disclosed herein a control unit and corresponding method for a dolly vehicle arranged to prevent dolly vehicle operation until an authorization process has been successfully completed. This authorization process may comprise an external master control unit providing a form of authorization prior to the dolly entering slave mode and accepting requests from the master control unit. The authorization may comprise a shared secret, a challenge response procedure, or some other form of known authorization method.

FIG. 3 shows a vehicle combination 300 comprising a dolly vehicle 130 connecting a first trailer 120 to a second trailer 140. The control unit in the dolly vehicle 130 is here configured in slave mode, and it continuously receives global force requests from the control unit in the truck 110 which is acting as master. Each trailer unit 120, 140 also comprises a VMM acting in slave mode. The MSDs on a trailer normally comprise only brakes, but some trailers may also be equipped with electric machines, active suspension, and even one or more steerable axles.

A vehicle combination such as the combination 300 shown in FIG. 3 comprises a plurality of local coordinate systems C1, C2, C3, and C4. Lateral forces Fy, longitudinal forces Fx, and moments of inertia Mz about some point on a vehicle unit can be expressed in a global coordinate system or in a local coordinate system associated with a particular vehicle unit. It is convenient for each VMM of the vehicle combination to receive global force requests from the master VMM in its own local coordinate system. The VMM receiving the request in its own coordinate system then only needs to coordinate its MSDs without keeping track of the state of other vehicle units in the combination. According to some aspects of the present disclosure, the master VMM determines global force requests in each of the coordinate systems (C1-C4) of the vehicle combination and sends global force and moment requests to each VMM in its own coordinate system, i.e., the requests sent to the dolly unit 130 are formulated in coordinate system C3 while the requests sent to the second trailer unit 140 are instead formulated in coordinate system C4. Alternatively, the transmitted force requests are given in a global coordinate system and a transform for transforming into the desired coordinate system is provided by the master VMM function with each request. This greatly simplifies VMM design for the slave units and also the interface between the different VMMs in a vehicle combination.

To transform a vehicle state such as a velocity or acceleration vector, a rotation and potentially also a translation is required. The translation is normally just a biasing based on a relative location of the two coordinate systems in space. A rotation from one coordinate system into another coordinate system can, e.g., be perform by multiplication with a rotation matrix. Suppose that the rotation around an X-axis of one vehicle unit with respect to another vehicle unit is $\phi$, the rotation around a Y-axis is $\theta$, and the rotation around a Z-axis is $\varphi$, then the corresponding rotation matrix is $$R = R_X R_Y R_Z$$

$$R_X = \begin{bmatrix} 1 & 0 & 0 \\ 0 & \cos(\phi) & \sin(\phi) \\ 0 & -\sin(\phi) & \cos(\phi) \end{bmatrix}$$

$$R_Y = \begin{bmatrix} \cos(\theta) & 0 & \sin(\theta) \\ 0 & 1 & 0 \\ -\sin(\theta) & 0 & \cos(\theta) \end{bmatrix}$$

$$R_Z = \begin{bmatrix} \cos(\varphi) & \sin(\varphi) & 0 \\ -\sin(\varphi) & \cos(\varphi) & 0 \\ 0 & 0 & 1 \end{bmatrix}$$

Any vector can be rotated by multiplication with the matrix R. The VMM is able to determine this matrix based on the state of the vehicle combination, i.e., based on vehicle unit geometries and articulation angles.

FIG. 4 shows the vehicle combination 300 as it executes a turning maneuver. The different vehicle units then exhibit articulation angles $\psi 1$-$\psi 3$. These articulation angles can be determined using, e.g., articulation angle sensors, vision sensors, or by using global positioning receivers arranged on the different vehicle units. Knowing the vehicle unit lengths in the combination and the articulation angles, a vehicle velocity or acceleration vector for one of the vehicle units can be translated to the coordinate system of another vehicle unit by trigonometric operations in a known manner. Thus, according to aspects, the state information transmitted between master VMM and slave VMM corresponds to state information associated with the master vehicle and geometrically transformed into a local coordinate system associated with the dolly vehicle. According to aspects, the dolly vehicle 130 is arranged to, when in the slave mode configuration, receive state information from the external master vehicle control unit and/or from an external control unit connected via wireless link, wherein the state information is associated with a local coordinate system of the dolly vehicle.

FIG. 5 illustrates lateral Fcx and longitudinal Fcy coupling forces of the vehicle combination 300 for different coupling points. The coupling forces may be given in two or three dimensions, depending on implementation. Each coupling point therefore has an associated coupling force vector given by the longitudinal and lateral force components, and possibly also by a vertical force component Fz. These coupling forces offer another dimension of vehicle control which can be exploited by a VMM, such as a master VMM function in a prime mover, in order to generate a set of required global forces. For instance, coupling force may be used to brake a vehicle unit which experiences poor friction by a rearward vehicle unit which experiences better friction conditions, i.e., using the rearward vehicle unit as an anchor to slow down the whole vehicle combination. According to aspects, the dolly vehicle 130 is arranged to control the at least one MSD to generate a requested coupling force associated with the drawbar or with a fifth wheel connection of the dolly vehicle. Small or even non-existent coupling forces are normally desired when braking a vehicle combination, which means that each vehicle unit in a vehicle combination applies its service brakes to a degree which brakes the vehicle unit without generating significant coupling forces with respect to other vehicle units in the combination. However, the coupling forces may also be used for more advanced vehicle control. For instance, the master VMM may request an increased coupling force somewhere along the vehicle combination in order to brake the vehicle by using the rearward vehicle units as anchors. This will also have the effect of straightening out a vehicle combination, which may be desired in some scenarios.

FIGS. 6A and 6B illustrate the master mode and the slave mode which the herein disclosed dolly vehicle control unit 602 may be configured in. In FIG. 6A, the dolly vehicle 130 is connected to a truck 110 comprising a master control unit 601. The main TSM functionality is then executed by the master control unit in the truck 110, and the dolly control unit 602 is operating in slave mode as discussed above. The master VMM then determines the global forces and moments that are needed to fulfil the requests coming from the TSM layer. These global forces and moments are preferably translated into a local coordinate system associated with the dolly vehicle and transmitted over an interface 610 to the VMM in the dolly vehicle. The VMM in the dolly forwards the request from the master VMM to its actuators and responds back 620 to the master VMM with status messages and capability messages, such as the status of the service brakes and capability of any electric machine comprised in the dolly vehicle. The TSM function in the dolly vehicle is silent in FIG. 6A, since this functionality is being performed by the master control unit in the truck. As discussed above, and authorization process may be required before the dolly entering the master mode.

FIG. 6B shows a configuration where the master control unit in the truck 110 has been disconnected and where the dolly vehicle operates autonomously or semi-autonomously. As discussed above, and authorization process may be required before the dolly entering the master mode. The dolly vehicle then activates its full control stack comprising the TSM and potentially also higher layer control functions such as mission planning and the like. This local dolly TSM sends acceleration requests and/or curvature requests 710 down to the VMM function, which now performs the role of a master VMM, including MSD global force generation, moment generation, MSD coordination and the like.

Figure 7:
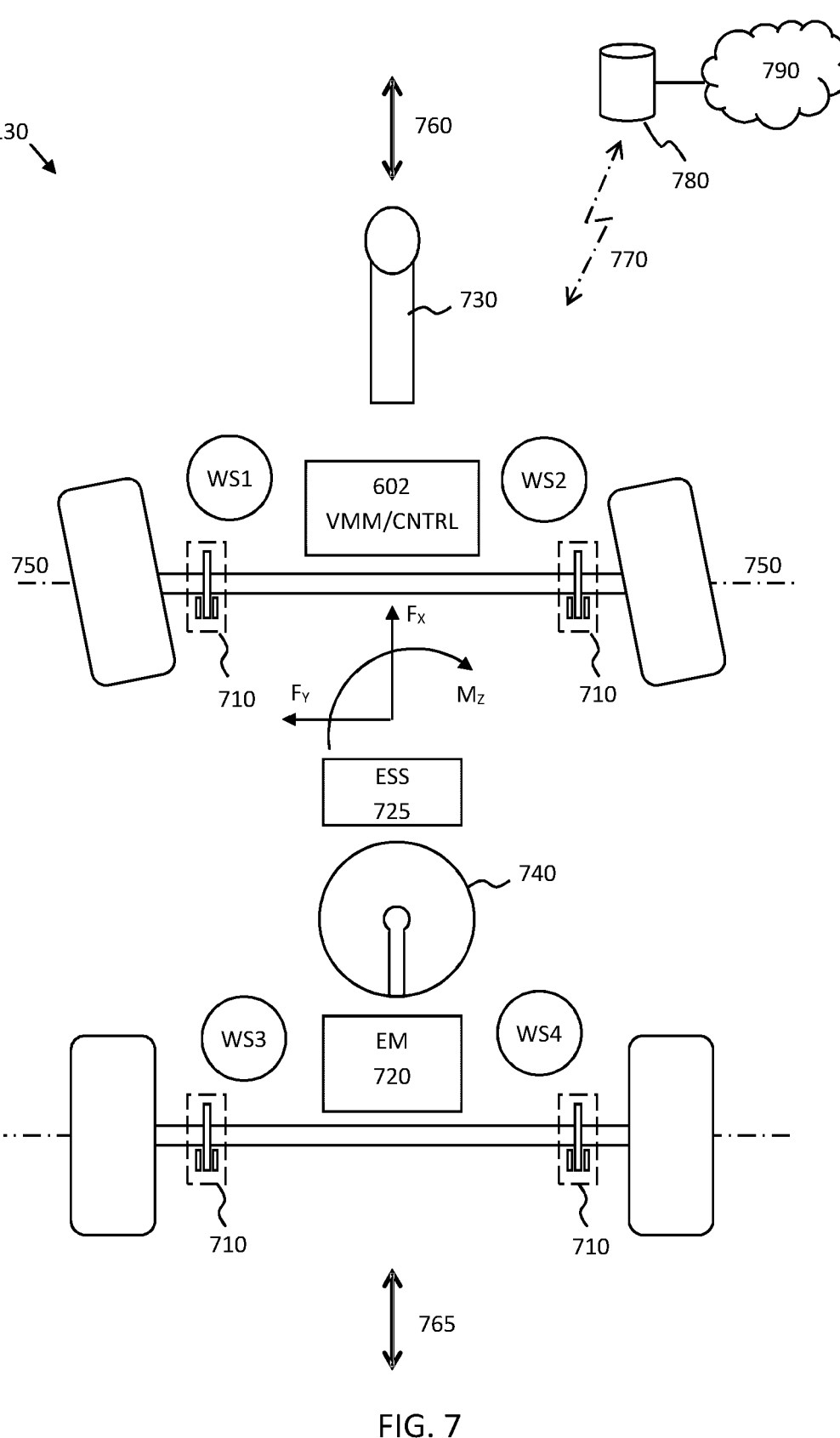
FIG. 7 schematically illustrates details of a dolly vehicle.

FIG. 7 shows aspects of the disclosed dolly vehicle 130. This dolly vehicle comprises a set of service brakes 710, here shown as disc brakes, although drum brakes or retarders are equally possible. The dolly vehicle also comprises an electric machine 720 and associated electrical energy storage (ESS) 725, which means that the dolly is self-powered and able to move both itself and one or more towed trailers without the assistance of a truck or prime mover vehicle. Thus, according to aspects, the at least one MSD of the dolly vehicle 130 disclosed herein comprises a propulsion unit 720 configured in connection to a driven axle of the dolly vehicle.

This particular dolly vehicle also comprises a steerable axle 750, i.e., according to aspects, the at least one MSD on the dolly vehicle 130 comprises a steerable axle 750 of the dolly vehicle.

The dolly vehicle may be connected to truck or forward vehicle unit via a drawbar connection 730. A trailer may be connected to the dolly via a fifth wheel connection 740. This drawbar connection may be used to trigger the master and slave mode selection by the dolly vehicle. Thus, according to some aspects, the master mode is automatically configured when a drawbar 730 of the dolly vehicle is in a disconnected state. According to some other aspects, the slave mode is automatically configured when the drawbar 730 of the dolly vehicle is at least indirectly connected to a master vehicle 110. An authorization procedure may be associated with configuring the dolly vehicle in master or slave mode as discussed above.

A control unit 602 is arranged on the dolly vehicle and configured to control the various MSDs on the dolly vehicle, i.e., the brakes, the steering, the electric machine, and potentially also the suspension. The control unit implements the type of VMM functions discussed above and can be configured in a master mode or in a slave mode depending on operating scenario. This control unit 602 may be communicatively coupled to a forward part of a vehicle combination via a forward interface 760, and to a rearward part of a vehicle combination via a rearward interface 765.

Notably, the control unit 602 may also be connected to a remote control unit or server 780 via a wireless link 770. This remote control unit may be connected to a communications network 790, such as a communications network defined by the third generation partnership program, 3GPP. Examples of such networks include 4G, 5G and 6G communication networks, as well as networks in the 802.11 family, in particular 802.11p.

The remote control unit 780 may, e.g., be comprised in a control tower arranged to control dollies in a cargo terminal. In this case, the dolly is configured to enter into a slave mode configuration and receive requests from the control tower in a way similar to when it is connected to a master towing vehicle.

To summarize, the interfaces are communications interfaces for connecting a dolly vehicle control unit 602 to an external control unit 601, 780, wherein each interface is configured to support transmission of state information geometrically transformed into a local coordinate system associated with the dolly vehicle 130, as discussed above in connection to FIGS. 3, 4, and 5. According to aspects, the dolly vehicle 130 is arranged to, when in the slave mode configuration, transmit status information and capability information to the external master vehicle control unit and/or to an external control unit connected via wireless link.

The dolly vehicle may furthermore comprise wheel speed sensors WS1-WS4 configured to measure wheel speeds. This enables the control unit 602 to perform fine grained slip control on the wheels using the service brakes and the electric machine. For instance, the control unit 602 on the dolly unit may receive vehicle state data, comprising vehicle velocity, in its own coordinate system via one of the interfaces 760, 765 and 770, and based on this velocity determine wheel slip, in accordance with SAE J670 (SAE Vehicle Dynamics Standards Committee Jan. 24, 2008), as $$\lambda = \frac{R\omega - v_x}{\max\left(|R\omega|, |v_x|\right)}$$

where R is an effective wheel radius in meters, ω is the angular velocity of the wheel obtained from the wheel speed sensor, and $v_x$ is the longitudinal speed of the wheel (in the coordinate system of the wheel).

According to aspects, the slave mode is automatically configured when the control unit 602 of the dolly vehicle is connected via wireless link 770 to an external control unit 780.

To summarize, with reference to FIG. 7, there is disclosed herein a dolly vehicle 130 comprising at least one motion support device (MSD) 710, 720 and a control unit 602 arranged for vehicle motion management (VMM). The control unit 602 is configurable in a master mode where the at least one MSD is controlled based on a set of capabilities of a vehicle combination 150 comprising the dolly vehicle 130 to fulfil an assigned task. The control unit is also configurable in a slave mode where the at least one MSD is controlled based on requests received from an external master control unit.

According to aspects, the at least one MSD comprises a propulsion unit 720 configured in connection to a driven axle of the dolly vehicle.

According to aspects, the at least one MSD comprises a steerable axle 750 of the dolly vehicle.

According to aspects, the dolly vehicle 130 is arranged to control the at least one MSD to generate a requested coupling force associated with the drawbar 730 or with a fifth wheel connection 740 of the dolly vehicle.

Figure 8:
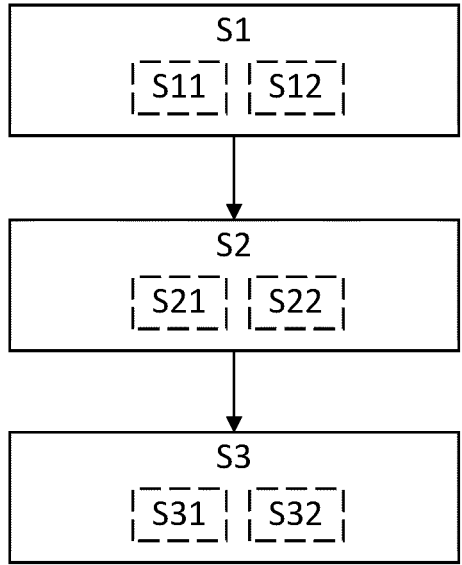
FIG. 8 is a flow chart illustrating methods.

FIG. 8 is a flow chart illustrating a method for managing dolly vehicle motion, where the dolly 130 comprises at least one MSD 710, 720, the method comprises determining S1 if the dolly vehicle 130 is to operate in a master mode or in a slave mode, if the dolly vehicle 130 is to operate in the master mode controlling S2 the at least one MSD based on a set of capabilities of a vehicle combination 150 comprising the dolly vehicle 130 to fulfil an assigned task, and if the dolly vehicle 130 is to operate in the slave mode, controlling S3 the at least one MSD based on requests received from an external master control unit.

According to aspects, the method comprises executing S11 an authorization procedure prior to allowing the dolly to operate in master mode or in slave mode.

According to aspects, the method comprises establishing S12 an interface between a master VMM function and a slave VMM function operating in the dolly vehicle when the dolly vehicle is about to enter operation in slave mode.

According to aspects, the method comprises activating S21 a TSM function in the control unit comprised in the dolly vehicle when the dolly vehicle is operating in master mode.

According to aspects, the method comprises generating S22 global forces and moments for vehicle control when the dolly vehicle is operating in master mode.

According to aspects, the method comprises negotiating S31 capabilities of the dolly vehicle operating in slave mode with a master control unit.

According to aspects, the method comprises forwarding S32 MSD control requests from a master VMM function to MSDs in the dolly vehicle when the dolly vehicle is operating in slave mode.

According to aspects, the method comprises responding S33 back to a master VMM function with capability messages and status update messages when the dolly vehicle is operating in slave mode.

There is also disclosed herein a method comprising the following operations and actions;

1. From traffic situation management (TSM) requests of acceleration and curvature of the first unit and any following units that are smarter units such as self-powered dolly vehicles (comprising steering and/or propulsion functionality) is generated. The active TSM function can give curvature and acceleration request for this unit too. Another option is that VMM has a main behavior model that TSM can use for predictions and only controls the master unit/the first unit states and the rest of the motions are automatically controlled by VMM master in the combination.

2. The second step is that VMM master in global force generation calculates global forces and moments that needs to be generated by the slave VMM in each unit. These forces and moments will be transformed into each vehicle units local coordinate system.

3. An important feature is that when vehicle units are connected, coupling forces in towing couplings are decided by the master VMM. The coupling force control in many cases need to be zero like standard drawbar connector but in fifth wheel needs some load transfer and trailer pushing longitudinal force transmitted because the load off the semitrailer is not completely on trailer unit axles. Instead semitrailer payload is carried by the fifth wheel and tractor units driven axles.

4 The global forces and moment are sent to each unit as requests. Vehicle unit status and capabilities are sent back to master VMM unit.

5. Vehicle states that are estimated in VMM master such as vehicle longitudinal velocity in the first unit. This is communicated to slave vehicle units in the local coordinate system of each unit. This means for example that a dolly vehicle 130 can perform its own motion estimation of vehicle speed from the front axle wheel speeds when propulsion only is applied on 4×2 rear wheel. However, if the dolly vehicle 130 is braking, then all wheels or having slip control active on all wheels either from propulsion or braking it needs more motion estimation capability. The master VMM unit is sending vehicle velocity value in the dolly vehicles local coordinate system to be sure that it has the critical states for slave mode VMM motion control.

6. Each VMM on each unit is knowing what global forces, yaw moments, and coupling forces needs to be realized. The master VMM unit is solving the complete force generation and moment generation problem based on the desired behavior of the vehicle combination.

Figures 9, 10:
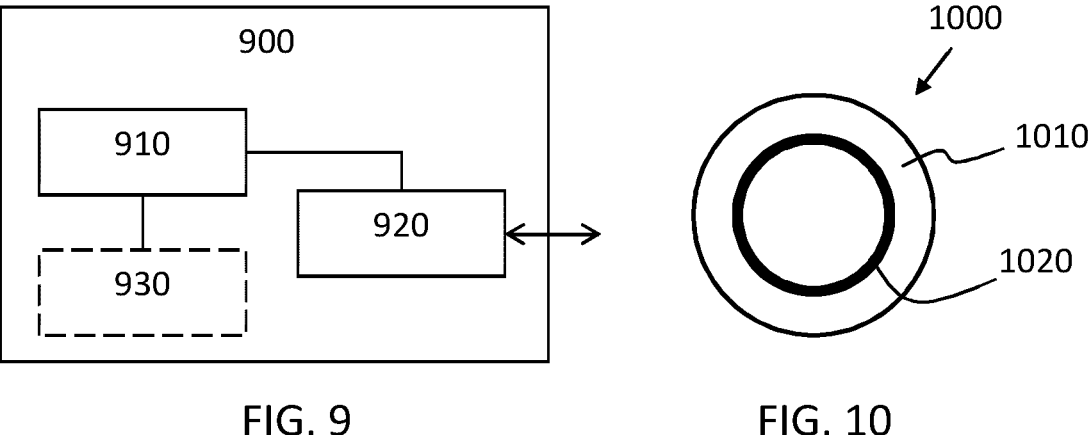
FIG. 9 schematically illustrates a control unit.
FIG. 10 shows an example computer program product.

FIG. 9 schematically illustrates, in terms of a number of functional units, the components of a control unit 900 according to embodiments of the discussions herein. This control unit 900 may be comprised in the vehicle 100, e.g., in the form of a VMM unit. Processing circuitry 910 is provided using any combination of one or more of a suitable central processing unit CPU, multiprocessor, microcontroller, digital signal processor DSP, etc., capable of executing software instructions stored in a computer program product, e.g. in the form of a storage medium 930. The processing circuitry 910 may further be provided as at least one application specific integrated circuit ASIC, or field programmable gate array FPGA.

Particularly, the processing circuitry 910 is configured to cause the control unit 900 to perform a set of operations, or steps, such as the methods discussed in connection to FIG. 10. For example, the storage medium 930 may store the set of operations, and the processing circuitry 910 may be configured to retrieve the set of operations from the storage medium 930 to cause the control unit 900 to perform the set of operations. The set of operations may be provided as a set of executable instructions. Thus, the processing circuitry 910 is thereby arranged to execute methods as herein disclosed.

The storage medium 930 may also comprise persistent storage, which, for example, can be any single one or combination of magnetic memory, optical memory, solid state memory or even remotely mounted memory.

The control unit 900 may further comprise an interface 920 for communications with at least one external device. As such the interface 920 may comprise one or more transmitters and receivers, comprising analogue and digital components and a suitable number of ports for wireline or wireless communication.

The processing circuitry 910 controls the general operation of the control unit 900, e.g., by sending data and control signals to the interface 920 and the storage medium 930, by receiving data and reports from the interface 920, and by retrieving data and instructions from the storage medium 930. Other components, as well as the related functionality, of the control node are omitted in order not to obscure the concepts presented herein.

FIG. 10 illustrates a computer readable medium 1010 carrying a computer program comprising program code means 1020 for performing the methods illustrated in FIG. 8, when said program product is run on a computer. The computer readable medium and the code means may together form a computer program product 1000.

The invention claimed is:

1. A dolly vehicle comprising at least one motion support device, MSD, and a control unit arranged for vehicle motion management, VMM, wherein the control unit is configurable in a master mode where the at least one MSD is controlled based on a set of capabilities of a vehicle combination comprising the dolly vehicle to fulfil an assigned task, and wherein the control unit is configurable in a slave mode where the at least one MSD is controlled based on requests received from an external master control unit, wherein the slave mode is automatically configured when the control unit of the dolly vehicle is connected via wireless link to an external control unit, wherein the slave mode is automatically configured when a drawbar of the dolly vehicle is at least indirectly connected to a master vehicle, and wherein the master vehicle comprises a control unit arranged to operate in the master mode.

2. The dolly vehicle according to claim 1, wherein the master mode is automatically configured when the drawbar of the dolly vehicle is in a disconnected state.

3. The dolly vehicle according to claim 1, arranged to, when in the master mode configuration, determine a curvature and/or an acceleration request comprising longitudinal and/or lateral acceleration, determine required global vehicle forces in response to the requests, and control the at least one MSD to coordinate and generate the required global vehicle forces and moments, wherein the moments comprise any of a yaw moment, a roll moment, and a pitch moment.

4. The dolly vehicle according to claim 1, arranged to, when in the slave mode configuration, receive a request for generating one or more required dolly vehicle forces and to control the at least one MSD to generate the one or more required dolly vehicle forces.

5. The dolly vehicle according to claim 1, arranged to, when in the slave mode configuration, receive state information from the external master vehicle control unit and/or from an external control unit connected via wireless link, wherein the state information is associated with a local coordinate system of the dolly vehicle.

6. The dolly vehicle according to claim 5, wherein the state information comprises any of a velocity vector, an acceleration vector, and a rotation associated with the dolly vehicle.

7. The dolly vehicle according to claim 5, wherein the state information corresponds to state information associated with the master vehicle and geometrically transformed into a local coordinate system associated with the dolly vehicle.

8. The dolly vehicle according to claim 1, arranged to, when in the slave mode configuration, transmit status information and capability information to the external master vehicle control unit and/or to an external control unit connected via wireless link.

9. The dolly vehicle according to claim 1, wherein the at least one MSD comprises a propulsion unit configured in connection to a driven axle of the dolly vehicle.

10. The dolly vehicle according to claim 1, wherein the at least one MSD comprises a steerable axle of the dolly vehicle.

11. The dolly vehicle according to claim 1, arranged to control the at least one MSD to generate a requested coupling force associated with the drawbar or with a fifth wheel connection of the dolly vehicle.

12. A method for managing dolly vehicle motion, where the dolly vehicle comprises at least one motion support device, MSD, the method comprising:

determining if the dolly vehicle is to operate in a master mode or in a slave mode, where the dolly vehicle is to operate in slave mode at least when a control unit of the dolly vehicle is connected via wireless link to an external control unit, wherein the slave mode is automatically configured when a drawbar of the dolly vehicle is at least indirectly connected to a master vehicle, when the dolly vehicle is to operate in the master mode controlling the at least one MSD based on a set of capabilities of a vehicle combination comprising the dolly vehicle to fulfil an assigned task, and when the dolly vehicle is to operate in the slave mode controlling the at least one MSD based on requests received from an external master control unit, wherein the master vehicle comprises a control unit arranged to operate in the master mode.

13. A non-transitory computer program comprising program code for performing the steps of claim 12 when said program code is run on a computer or on processing circuitry of a control unit.

* * * * *